United States Patent [19]

Pernet

[11] Patent Number: 5,012,078
[45] Date of Patent: Apr. 30, 1991

[54] IC CARD READER HAVING LEVER THAT BENDS CARD ONTO IC CONTACTS

[75] Inventor: Michel Pernet, Pontarlier, France

[73] Assignee: Alcatel Cit, Paris, France

[21] Appl. No.: 372,738

[22] Filed: Jun. 28, 1989

[30] Foreign Application Priority Data

Jul. 1, 1988 [FR] France .................... 88 08934

[51] Int. Cl.⁵ .................................. G06K 7/06
[52] U.S. Cl. .......................... 235/441; 235/483; 235/486; 235/492
[58] Field of Search ............. 235/492, 483, 486, 441; 439/260

[56] References Cited

U.S. PATENT DOCUMENTS

| | | | |
|---|---|---|---|
| 3,831,119 | 8/1974 | Ambrosio | 235/492 |
| 4,616,128 | 10/1986 | Case | 235/483 |
| 4,717,817 | 1/1988 | Grassl et al. | 235/492 |
| 4,810,863 | 3/1989 | Kachi et al. | 235/441 |

FOREIGN PATENT DOCUMENTS

| | | | |
|---|---|---|---|
| 198739 | 10/1986 | European Pat. Off. | |
| 263746 | 4/1988 | European Pat. Off. | |
| 0274684 | 7/1988 | European Pat. Off. | 235/483 |
| 0282296 | 9/1988 | European Pat. Off. | 235/486 |
| 3602668 | 7/1987 | Fed. Rep. of Germany | |
| 2607287 | 5/1988 | France | |

Primary Examiner—Stuart S. Levy
Assistant Examiner—Kenton R. Mullins
Attorney, Agent, or Firm—Sughrue, Mion, Zinn, Macpeak & Seas

[57] ABSTRACT

An IC card reader comprising card positioning or guide means, optionally means for verifying that the card is present in the reader in a position suitable for being read, and contact elements for providing electrical connection with conducting pads on the IC card, whereby circuits are established with the apparatus containing the IC card reader. The reader further comprises: a rocking lever (400 including a central pivot (41); an actuating cam (47) on one side of the pivot and against which a card (2) being inserted comes to bear at the end of its insertion stroke, thereby pivoting the lever from a rest position to a pressure-applying position; a pressure cam (51) on the other side of the pivot for bearing against the card when the rocking lever is in its pressure-applying position, thereby bending the card towards the contact elements (4); and resilient return means (45, 46) returning the rocking lever to its rest position when it is not engaged by a card inserted in the reader.

3 Claims, 2 Drawing Sheets

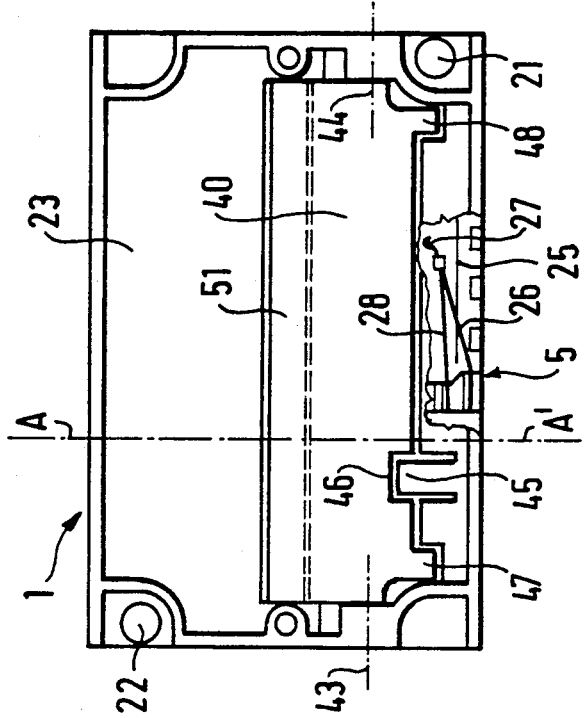
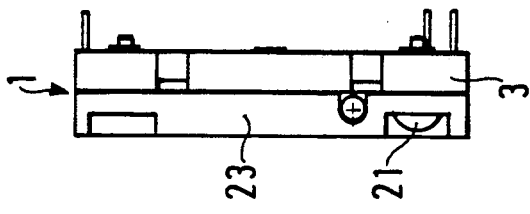
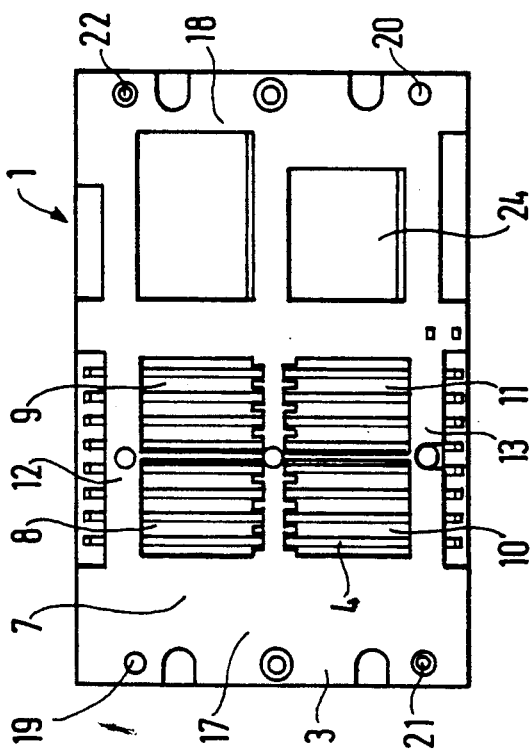
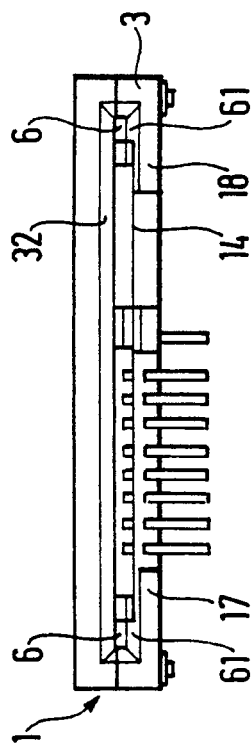

IC CARD READER HAVING LEVER THAT BENDS CARD ONTO IC CONTACTS

The present invention relates to an IC card reader, and more particularly to such an IC card reader provided with mechanical means for establishing pressure between a card inserted in the reader and reading contacts.

BACKGROUND OF THE INVENTION

French patent application No. 87/15739, filed Nov. 13, 1987 in the name of Alcatel CIT describes IC card readers in general, and an IC card contact frame in particular. It is specified therein that such a reader comprises card guiding or positioning means, optional means for verifying that a card is indeed present in the reader in a suitable position for reading, and contact elements which make electrical contact with conducting tabs on the IC card, whereby electrical circuits are set up with the apparatus including the IC card reader. The contact frame is a single part enabling the above-specified functions to be performed. Given manufacturing tolerances, it makes it possible, when an IC card is inserted, to ensure that the contact elements bend in such a manner as to ensure that the required contact pressure is always obtained.

Such a design suffers from the drawbacks that the contact elements apply the specified contact pressure from the beginning of card insertion, prior to the card being in the reading position. This gives rise to pointlessly high friction between these contact elements and the card, thus causing excessive wear. Because of this state of affairs, the desired contact pressure is as low as possible while still obtaining adequate electrical contact performance. In addition, and as mentioned in said prior patent application, the pressure of the contact elements is also used for holding the card in the reader against the return force of an end-of-stroke contact, for example. Insofar as the contact element pressure is limited, it follows that the pressure of the end-of-stroke contact is also limited.

These various considerations means that it is desirable for the contact pressure between the contact elements of the IC card reader and the contact tabs on the IC card to be established, at least in part, by mechanical means which act to set up electrical circuits with the IC card, once the card is substantially in the reading position.

The object of the present invention is to provide an IC card reader including such means.

SUMMARY OF THE INVENTION

The present invention provides an IC card reader comprising card positioning or guide means, optionally means for verifying that the card is present in the reader in a position suitable for being read, and contact elements for providing electrical connection with conducting pads on the IC card whereby circuits are established with the apparatus containing the IC card reader, wherein the reader further comprises a rocking lever including a central pivot, an actuating cam on one side of the pivot and against which a card being inserted comes to bear at the end of its insertion stroke, thereby pivoting the lever from a rest position to a pressure-applying position, a pressure cam on the other side of the pivot for bearing against the card when the rocking lever is in its pressure-applying position, thereby bending the card towards the contact elements, and resilient return means returning the rocking lever to its rest position when it is not engaged by a card inserted in the reader.

Said guide means may constitute slideways comprising inlet portions and end-of-stroke portions, thereby enabling the card to be bent between said two portions.

Said guide means may include end-of-stroke portions forming ramps for guiding the card towards said actuating cam.

Said resilient return means comprise a resilient tongue integrally formed either with the lever or else with said guide means.

Said rocking lever may be incorporated in a contact frame so that the IC card reader can carrying all of the means for establishing electrical circuits with an IC card inserted in the reader.

Advantageously, the positions of the contact elements and the elastic characteristics of these contacts elements are such that, prior to the card being bent and the required contact pressure being established, the contact elements rub lightly against the card while it is being inserted.

The following advantages are thus obtained: the electrical contact between the contact elements and the card while the card is being inserted makes it possible to remove any static electricity that may have accumulated on the card prior to its insertion; the mechanical contact between the contact elements and the card makes it possible to ensure that the contact elements are self-cleaning without excessive wear; and the pressure exerted by the rocking lever provides increased contact pressure and better card retention force.

BRIEF DESCRIPTION OF THE DRAWINGS

An embodiment of the invention is described by way of example with reference to the accompanying drawings, in which:

FIGS. 1, 2, 3, and 4 are respectively a view from beneath, from the side, from above, and from the end of a contact frame for an IC card reader including a rocking lever of the present invention.

DETAILED DESCRIPTION

Figure 5:
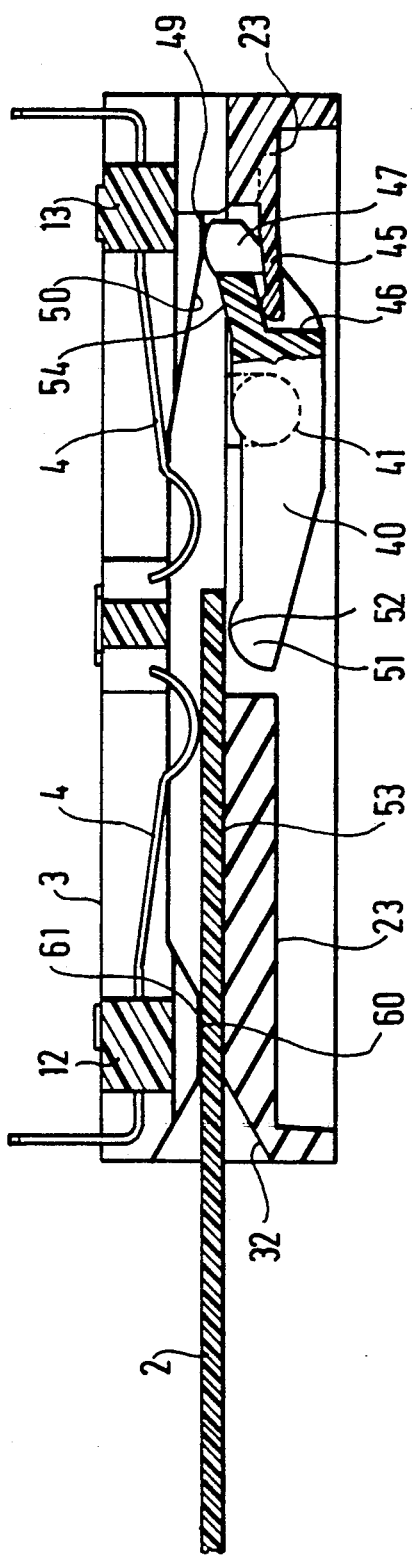
FIGS. 5 and 6 are section views on a larger scale through the contact frame of the preceding figures, showing a card partially inserted and a card fully inserted.

FIGS. 1 to 4 show a contact frame 1 designed in accordance with the present invention. The frame 1 essentially comprises a base part 3 made of insulating molded material and acting simultaneously as a support for contact elements 4 used for making connections with the pad of a card (not shown), as a support for an end-of-stroke contact 5 (FIG. 3) for indicating that a card is present in the reader and that it is suitably positioned for being read, and as a support, at least, for slideways 6 (FIG. 6) for guiding the card and intended to convey it to the reading position in a manner described below.

To this end, the contact frame 1 comprises an inner frame 7 constituted by the portions of the frame 1 which delimit connection windows 8, 9, 10, and 11. The contact elements 4 extend into the windows from bars 12 and 13 in which they are overmolded. The contact elements 47 are shaped and project over the plane 14 of the inside surface of the part 3 (FIG. 4). They are to make contact with the contact areas or pads of the connection zone of the IC card once the card is fully inserted into the card reader.

The inner frame 7 (FIGS. 1 and 4) is extended by two extensions 17 and 18 which terminate opposite the inner frame 7 in slideways 6. The slideways 6 are formed in the same material as the part 3 on which a part 23 of molded insulating material is disposed as a lid. This lid part 23 is accurately positioned relative to the frame 1 by centering studs 19 and 20 and it is fixed thereto by rivets 21 and 22. It guides the card inserted into the contact frame by engaging the edges of the card.

As can be seen in FIG. 1, the extensions 17 and 18 advantageously contain voids 24 in order to save material.

The contact frame 1 also carries the end-of-stroke contact 5 and an end-of-stroke abutment 25 shown in a cutaway portion of FIG. 3. This end-of-stroke contact is a break contact which is opened shortly before the card engages the end-of-stroke abutment 25, by opening being performed by the end of the card engaging the end 27 of the moving spring 26, thereby separating it from the fixed contact spring 28.

It will also be observed that the card insertion opening between the parts 1 and 23 is chamfered at 32 in conventional manner.

Figure 6:
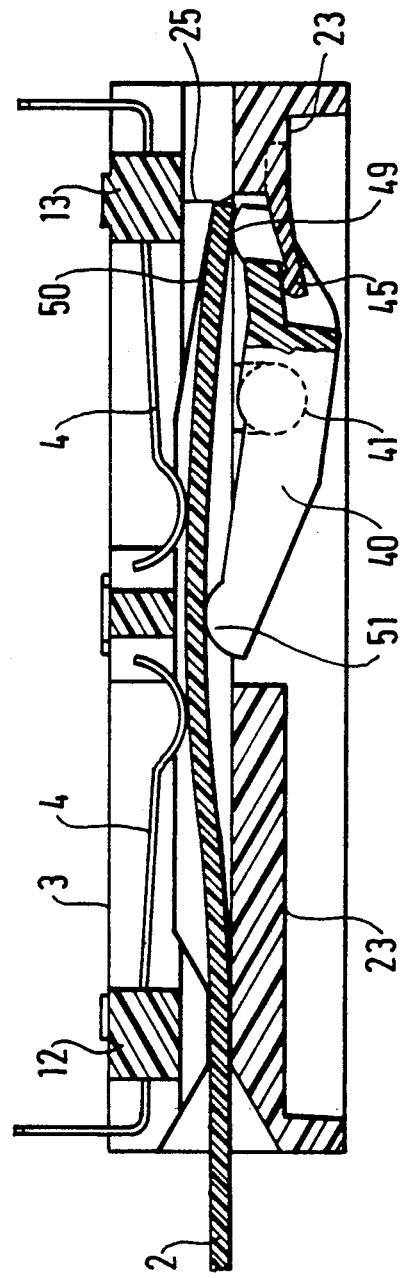

The dispositions more particularly constituting the present invention are illustrated in FIGS. 3, 5, and 6, to which reference is now made.

A rocking lever 40 is disposed in the part 23. It pivots on two pivots 41 whose axes 43 and 44 are shown in FIG. 3. The pivots 41 may be constituted by stub axles projecting from the lever 40 and received in recesses in the wall of the lid part 23. The lever 40 is held in its rest position as shown in FIG. 5 by resilient return means, constituted in this case by a tongue 45 integrally molded with the part 23 and engaged in a hollow 46 in the lever 40, urging the lever upwards in FIGS. 5 and 6 until it bears against the part 3 via its actuator cams 47 and 48. More precisely, the surface 49 of the cams 47 and 48 bears against a guide ramp 50 formed on the base part 3. At its end opposite to the cams 47 and 48 relative to its pivots 41, the lever 40 has a pressure cam 51.

The dimensions of the lever, in particular, are such that, while at rest in the position shown in FIG. 5, the surface 52 of the pressure cam 51 is at the same level as the top surface of the part 23 over which the IC card 2 slides while being inserted. The card is initially guided by an inlet portion 60 of the slideway 6 comprising the surface 53 of the part 23 and the bearing surface 61 of the part 3. Beyond the bearing surface 61, the card being inserted moves forwards and lightly raises the contact elments 4, thereby discharging any static electricity that may be charged on the surface of the card and also cleaning the contact surfaces. The card continues to move forwards until it reaches the surfac 54 of the lever 40. The front end of the card 2 may then be lifted, but it comes into abutment against the ramp 50 constituting the end-of-stroke portion of the slideways 6. Thereafter, under thrust from the user, the card 2 causes the lever 40 to rock about its pivot 41 with the cam 50 retracting while the pressure cam 51 is extended.

The final position is shown in FIG. 6. Pressed against the ramp 50 and abutting against the abutment 25, the card 2 has moved the lever 40 into a position in which it bends the card 2 upwards by virtue of the pressure exerted upwards by the pressure cam 51. This pressure is applied in the vicinity of the active ends of the contact elements 4. The elements are thus lifted, and the resilient characteristics thereof determine the resulting contact pressure as a function of the distance through which they are moved. This distance is determined by the characteristics of the lever and by the thickness of the card, i.e. it is accurately determined. It should be observed that the card is then held by friction between the ramp 50 and the return tongue 45 and also between the contact elements 4 and the pressure cam 51 of the lever 40. When the card is extracted, the tongue 45 returns the lever 40 to the position shown in FIG. 5.

Naturally the above description is given by way of non-limiting example and numerous variants could be envisaged without going beyond the scope of the invention.

I claim:

1. An IC card reader comprising: a contact frame, card positioning and guide means carried by said contact frame including an inlet portion and an end-of-stroke portion for guiding an inserted card into a card insertion movement into the IC card reader and positioning opposite ends of said IC card when said IC card is fully inserted in said contact frame, and contact elements for providing electrical connection, conducting pads on a face of said IC card, whereby circuits are established with an apparatus containing the IC card reader, said IC card reader further comprising: a rocking lever having a central pivot on said contact frame, and an actuating cam on one side of the central pivot against which said IC card, upon being inserted, comes to bear at the end of the IC card insertion stroke, thereby pivoting the lever from a rest position to a pressure-applying position, a pressure cam on the opposite side of said central pivot for bearing against the IC card in about a center part thereof relative to the length of the card and on the face thereof opposite said face bearing said conducting pads, when the rocking lever is in its pressure-applying position, thereby bending the IC card between said inlet portion and said end-of-stroke portion and giving the card a convex curvature towards the contact elements and pressing thereagainst to insure circuit completion between the conducting pads on the IC card and the contact elements, and resilient returns means for returning the rocker lever to its rest position when the rocking lever is free of engagement with said inserted IC card.

2. An IC card reader according to claim 1, wherein said positioning and guide means end-of-stroke portion forms a ramp for guiding the inserted end of the card towards said actuating cam.

3. An IC card reader according to claim 1, wherein said resilient return means comprises a resilient tongue integrally formed with one of said lever and said positioning and guide means.

* * * * *